United States Patent [19]
Gintick et al.

[11] 3,719,370
[45] March 6, 1973

[54] ANTI-THEFT SHOPPING CART

[76] Inventors: Richard Conway Gintick, 126 Bond Street; Michael Norman Gintic, 700 Park Street, both of Hartford, Conn.

[22] Filed: April 2, 1971

[21] Appl. No.: 130,733

Related U.S. Application Data

[63] Continuation-in-part of Ser. No. 842,443, July 16, 1969, abandoned.

[52] U.S. Cl. ..................280/33.99 C, 16/18 CG
[51] Int. Cl. .........................................B62b 11/00
[58] Field of Search .280/33.99 C, 33.99 R, 43, 43.1; 16/18 CG, 19, 18 R

[56] References Cited

UNITED STATES PATENTS

| | | | |
|---|---|---|---|
| 3,186,728 | 6/1965 | Turlington | 280/33.99 C |
| 3,272,527 | 9/1966 | Martin | 280/33.99 C |
| 1,900,672 | 3/1933 | Uhl | 18/18 R |
| 1,079,587 | 11/1913 | Anthony | 28/43.1 |
| 623,157 | 4/1899 | Hunter | 16/18 R UX |

*Primary Examiner*—Leo Friaglia
*Assistant Examiner*—Milton L. Smith
*Attorney*—McCormick, Paulding & Huber

[57] ABSTRACT

A shopping cart adapted to travel on a substantially smooth horizontal operating surface and having vertically adjustable guard plates mounted on the wheel supports thereof. Each guard plate has a horizontally disposed guard surface for positioning near the operating surface to engage and prevent the cart from rolling over surface irregularities. Each guard plate is adjustable relative to and releasably retained in assembly with an associated wheel support by an axle bolt which also serves to restrain the guard plate against angular movement relative to the wheel support.

6 Claims, 6 Drawing Figures

PATENTED MAR 6 1973 3,719,370
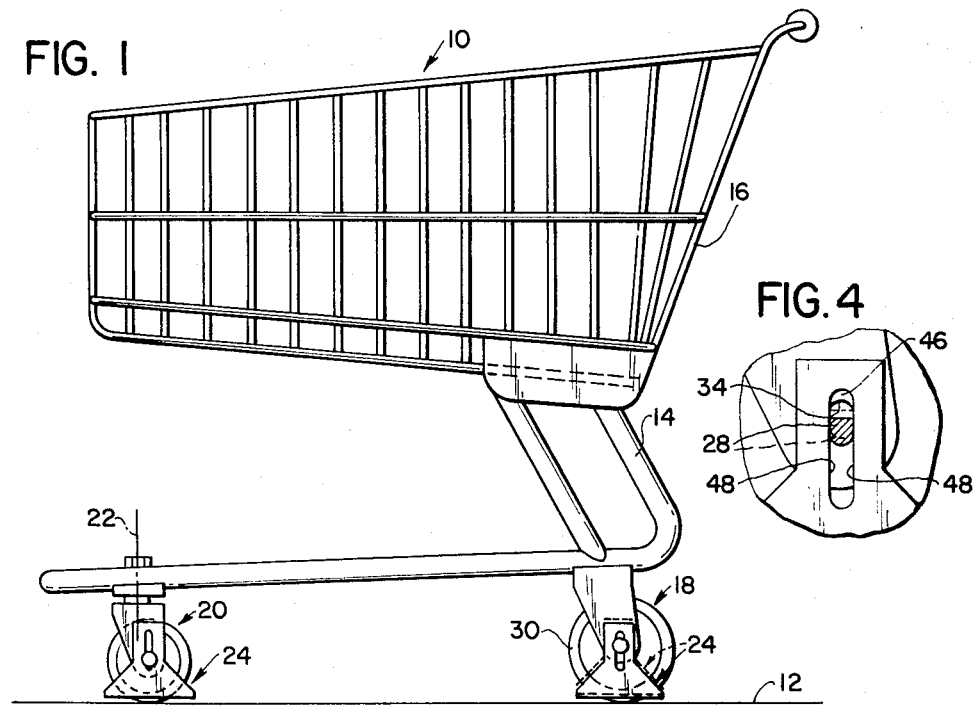
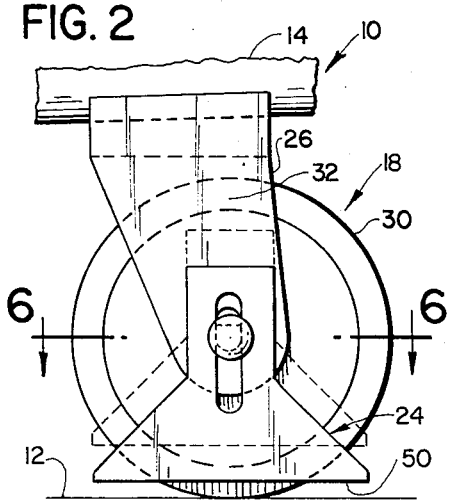
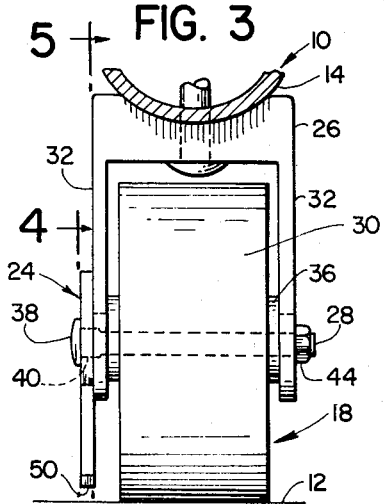
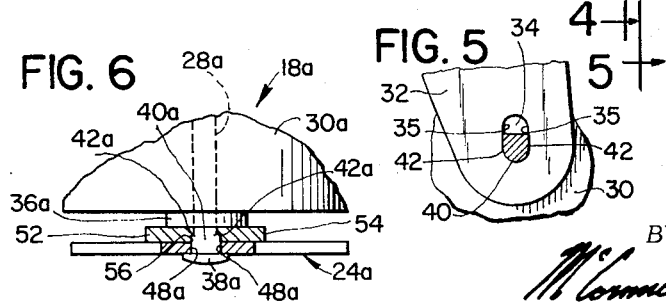
INVENTORS
RICHARD C. GINTICK
MICHAEL N. GINTIC
BY McCormick, Paulding & Huber
ATTORNEYS

ANTI-THEFT SHOPPING CART

CROSS REFERENCE TO RELATES APPLICATION

This is a continuation-in-part of application Ser. No. 842,443, filed July 16, 1969 and now abandoned.

BACKGROUND OF THE INVENTION

This invention relates in general to shopping carts and deals more particularly with shopping carts of the type provided with individual wheel guards for preventing the carts from being rolled over uneven surfaces, curbings and the like.

The high incidence of theft and malicious mischief associated with the operation of shopping carts is well known and has proven to be a serious problem in the merchandising field. In an effort to overcome this problem, carts have been provided which include various guarding devices to prevent the carts from rolling over uneven surfaces. The general aim of the present invention is to provide an improved guarded cart of the aforedescribed type having an individual guarding device associated with each of the wheels thereof and arranged for adjustment relative thereto through a range of positions so that the cart may be adapted for operation under various surface conditions. A further aim of the invention is to provide a cart having a plurality of guarding devices equal in number to the wheels thereon, each guarding device being substantially identical to the other and releaseably retained in fixed position proximate an associated wheel by an axle bolt.

SUMMARY OF THE INVENTION

In accordance with the present invention an improved cart is provided having a plurality of individually adjustable guard plates mounted thereon and equal in number to the number of wheels on the cart. Each guard plate is mounted adjacent an associated wheel support bracket and is adjustable through a range of positions to adapt the cart for operation on various surfaces having varying degrees of irregularity. Each guard plate is releasably retained in assembly with an associated wheel mounting bracket by an axle bolt which also serves to restrain the guard against angular movement relative to the mounting bracket.

BRIEF DESCRIPTION OF THE DRAWINGS

FIG. 1 is a side elevation of a side elevational view of a shopping cart embodying the invention.

FIG. 2 is a somewhat enlarged fragmentary side elevational view of the cart of FIG. 1 and shows the rear wheel assembly thereof with a cart guard mounted thereon.

FIG. 3 is a fragmentary end view and shows the wheel assembly and cart guard of FIG. 2.

FIG. 4 is a sectional view taken along the line 4—4 of FIG. 3.

FIG. 5 is a sectional view taken along the line 5—5 of FIG. 3.

FIG. 6 is a sectional view as taken generally along the line 6—6 of FIG. 2, but illustrates another embodiment of the invention.

DETAILED DESCRIPTION OF PREFERRED EMBODIMENTS

Turning now to the drawing and referring first particularly to FIGS. 1–3, a merchandise or shopping cart of nesting type embodying the present invention is indicated generally by the reference numeral 10. The cart 10 is particularly adapted to travel on a substantially smooth horizontal operating surface as, for example, a floor surface 12, and includes a frame 14 supported by a plurality of wheel assemblies and carrying a convention merchandise basket 16. The back of the basket (not shown) is hinged along its upper edge in a conventional manner to permit another cart of like kind to be nested in the cart 10 for convenient storage. The number and arrangement of the wheels which support the cart may vary, however, the illustrated cart 10 has four wheel assemblies which include a pair of rear wheel assemblies 18, 18 and a pair of front wheel assemblies 20, 20. The rear wheel assemblies are individually mounted in fixed positions on the frame 14. Each front wheel assembly 20 comprises a swivel caster mounted at the forward end of the frame 14 for swivelling movement about a generally vertical axis 22.

Each wheel assembly includes a wheel mounting bracket, an axle which extends horizontally through the mounting bracket and a wheel supported for rotation on the axle. In accordance with the present invention, a guard plate indicated generally at 24 is releasably retained in association with each wheel assembly and is mounted thereon in a manner hereinafter further described. Although the front and rear wheels on the cart 10 differ in size, it will be noted that each of the guard plates 24, 24 is of substantially the same size and shape. The guard plates cooperate to prevent or at least discourage movement of the cart 10 over an irregular operating surface.

Referring now more particularly to FIGS. 2–5, a guard plate 24 is shown mounted in an operating position on a typical rear wheel assembly 18. Considering first the wheel assembly 18 in further detail, it includes a rear mounting bracket 26 bolted or otherwise secured to the frame 14, an axle 28 and a wheel 30. The bracket 26 is generally U-shaped and includes a pair of spaced apart generally vertically disposed axle support members 32, 32. Each support member 32 has an aperture 34 therethrough horizontally aligned with another like aperture in the other support member 32 for receiving the axle 28 therethrough, as best shown in FIGS. 4 and 5. The shape of the apertures 34, 34 may vary, but preferably, and as shown, each aperture 34 comprises a slightly vertically elongated slot having a pair of opposing vertically disposed inwardly facing abutment surfaces 35, 35 and rounded upper and lower end portions, as best shown in FIG. 4. The slots 34, 34 permit the wheel 30 to be vertically adjusted relative to the mounting bracket 26. Thus, when the cart is provided with four wheels, as in the illustrated case, each wheel may be individually adjusted relative to its mounting bracket to support the cart 10 in a stable position on the floor 12.

The wheel 30 is received between the support members 32, 32 and preferably includes an inner or stationary hub portion 36 upon which an outer portion of the wheel is journaled. The axle 28 has an enlarged head 38 at one end thereof and a shank portion 40 adjacent the head and partially defined by a pair of generally vertically disposed and radially outwardly facing shoulders 42, 42, as best shown in FIG. 5. The other end of the axle is threaded to receive a nut 44, shown in FIG. 3. Preferably, and as shown, the axle 28 comprises a modified carriage bolt. The lower portion of the bolt shank 40 is rounded or ground away to remove associated portions of the shoulders 42, 42 which extend into an associated slot 34. The rounded lower portion of the shank 40 engages the rounded lower end of the slot 34 to permit sufficient vertical movement of the axle bolt 28 within the slot 34 to facilitate adequate wheel adjustment, two typical positions of adjustment being respectively indicated by full and broken lines in FIG. 4.

Considering now the guard plate 24 in further detail, this plate is substantially flat and has a generally triangular shape and an opening 46 therein for receiving the axle 28 therethrough. Preferably, and as shown, the opening 46 comprises a generally vertically elongated slot defined by a pair of generally radially inwardly facing bearing surfaces 48, 48. The plate 24 also includes a generally horizontally disposed guard surface 50 which is spaced downwardly from the opening 46 and extends in opposite directions beyond the peripheral surface of the wheel 30. The plate 24 is vertically disposed adjacent the outer surface of an associated support member 32 and is releasably retained in assembly therewith by the axle bolt 28. The enlarged head 38 bears against the outer surface of the plate 24 and the shank portion 40 extends through the slot 46 in the guard plate and into the slot 34 in the support member. The shoulders 42, 42 engage the abutment surfaces 35, 35 to restrain the axle bolt 28 against rotation relative to the mounting bracket 26. The bearing surfaces 48, 48 engage the shoulders 42, 42 to positively restrain the guard plate against angular movement relative to the mounting bracket 26.

The axle bolt 28 serves to releasably retain the wheel mounting bracket 26, the wheel 30 and the guard plate 24 in assembled relation. In the illustrated case, the cart 10 is adapted to travel on a relatively smooth floor surface 12. Accordingly, the guard plate 24 is adjusted so that the horizontally disposed guard surface 50 is positioned in close proximity to the floor 12, as it appears in full lines in FIG. 2. Thus, if the cart 10 is moved from its normal area of operation within a store or the like to another area having surface irregularities, as for example, a parking area outside of the store, the horizontal guard surface 50 will engage any surface irregularity encountered to prevent the cart from rolling over the irregularity. However, the guard plate 24 may be vertically adjusted through a range of positions to adapt the cart to roll over surfaces of varying irregularity and another position of adjustment is shown in broken lines in FIG. 2.

The present invention has been illustrated and described with reference to a cart having vertically adjustable wheels. However, it is not always essential that provisions be made for adjusting the various wheels, and this will be particularly true where a cart may, for example, be equipped with only three wheels. Such a modified form of the invention is shown in FIGS. 6, a portion of a typical cart rear wheel assembly being indicated generally at 18a. Parts of the wheel assembly 18a which are substantially identical to parts previously described bear the same reference numeral and a letter a suffix and will not be hereinafter further described in detail.

The wheel assembly 18a includes a wheel 30a, a wheel mounting bracket 52 and an axle 28a. The wheel assembly 18a differs from the assembly 18 previously described in the construction and arrangement of its mounting bracket. More specifically, the mounting bracket 52 includes a generally vertically disposed wheel support member 54 which has a circular aperture 56 therethrough for receiving a generally cylindrical axle member. The guard plate 24a is similar in all respects to the guard plate 24 previously described and is mounted adjacent the outside surface of the support member 54 and releasably retained in assembly with the mounting bracket 52 by the axle bolt 28a. The axle bolt 28a preferably comprises a conventional carriage bolt which includes shoulders 42a, 42a which cooperate with bearing surfaces 48a, 48a on the plate 24a to prevent the plate from turning relative to the axle bolt 28a. When the axle bolt 28a is drawn into assembly as by tightening a nut thereon (not shown), the shank portion 40a forcibly enters the aperture 56 and forms abutment surfaces thereon which complement the shoulder 42a, 42a to prevent the axle bolt from rotating relative to the support member 52. Thus, the guard plate 24a is releasably restrained against rotation relative to the mounting bracket 52a.

We claim:

1. The combination comprising a shopping cart adapted to travel on a substantially smooth horizontal operating surface and including a frame, a basket supported on said frame, a wheel mounting bracket attached to said frame and including a generally vertically disposed axle support member having an aperture therethrough, an axle having a shank portion partially defined by a pair of vertically disposed radially outwardly facing shoulders, said axle extending horizontally through said aperture, means for positively restraining said axle against axial rotation relative to said support member, and a wheel supported for rotation on said axle for rolling engagement with the operating surface, and a cart guard positioned adjacent said support member and releasably retained in assembly with said mounting bracket by said axle, said cart guard comprising a substantially flat plate having a generally vertically elongated slot therein receiving said axle therethrough, said slot being partially defined by a pair of vertically disposed radially inwardly facing bearing surfaces, each of said bearing surfaces engaging an associated one of said shoulders for positively restraining said guide plate against angular movement relative to said support member, said plate having an elongated horizontally disposed guard surface spaced downwardly from said opening and disposed in close proximity to the operating surface, said guard surface extending for some distance in opposite directions beyond the peripheral surface of said wheel and adapted to engage a surface irregularity associated with the operating surface to prevent said wheel from rolling over the surface irregularity.

2. The combination as set forth in claim 1 wherein said axle comprises a carriage bolt.

3. The combination as set forth in claim 1 wherein said plate has a generally triangular shape.

4. The combination comprising a shopping cart adapted to travel on a substantially smooth horizontal operating surface and including a frame, a basket supported on said frame, a wheel mounting bracket attached to said frame and including a pair of spaced apart generally vertically disposed axle support members each of said support members having an aperture therethrough generally horizontally aligned with said aperture in the other of said support members, a wheel received between said support members, and an axle extending coaxially through said wheel and through said apertures for supporting said wheel for rolling engagement with the operating surface, said axle having an enlarged head at one end thereof and a shank portion adjacent said head and partially defined by a pair of generally vertically disposed radially outwardly facing shoulders, a substantially flat generally triangular shaped guard plate vertically disposed adjacent the outer surface of one of said support members, said guard plate having a vertically elongated slot therein receiving said axle therethrough with said enlarged head bearing against the outer surface of said guard plate, said slot being partially defined by a pair of vertically extending radially inwardly facing bearing surfaces, each of said bearing surfaces engaging an associated one of said shoulders, said guard plate including an elongated horizontally disposed guard surface extending for some distance in opposite directions beyond the peripheral surface of said wheel and adapted to engage a surface irregularity associated with the operating surface to prevent said wheel from rolling over the surface irregularity and means for restraining said axle against axial rotation relative to said mounting bracket.

5. The combination as set forth in claim 4 wherein said aperture in said one support member is partially defined by a pair of generally vertically disposed inwardly facing abutment surfaces, said shank portion extends into the latter aperture, and each of said shoulders engages an associated one of said abutment surfaces, said shoulders and said abutment surfaces comprising said means for restraining said axle against axle rotation.

6. The combination as set forth in claim 5 wherein said axle comprises a carriage bolt.

* * * * *

UNITED STATES PATENT OFFICE
CERTIFICATE OF CORRECTION

Patent No. 3,719,370      Dated March 6, 1973

Inventor(s) Richard Conway Gintick and Michael Norman Gintic

It is certified that error appears in the above-identified patent and that said Letters Patent are hereby corrected as shown below:

Col. 1, line 2, "relates" should be --related--.

Col. 4, line 54, "guide" should be --guard--.

Signed and sealed this 20th day of November 1973.

(SEAL)
Attest:

EDWARD M. FLETCHER, JR.
Attesting Officer

RENE D. TEGTMEYER
Acting Commissioner of Patents